UNITED STATES PATENT OFFICE.

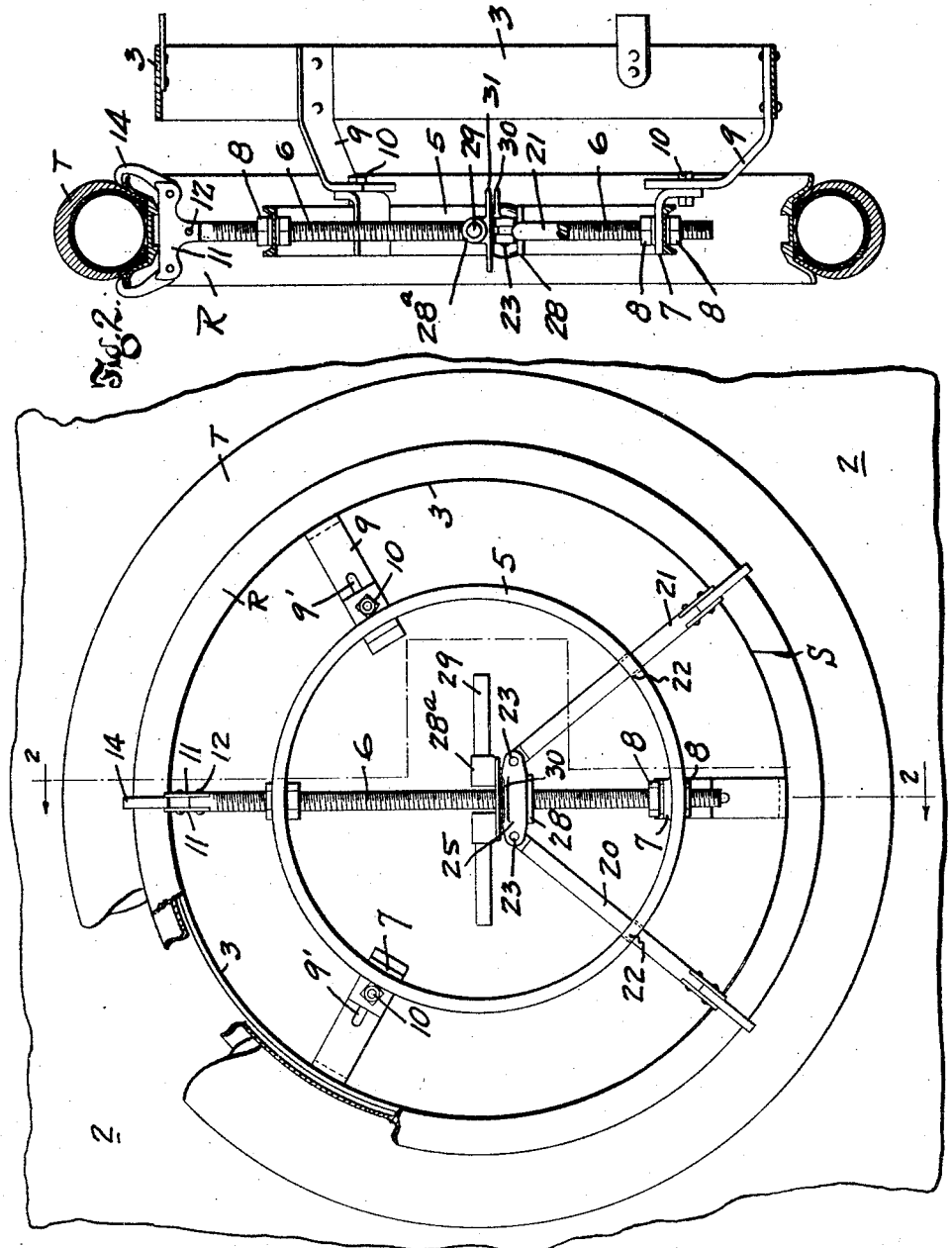

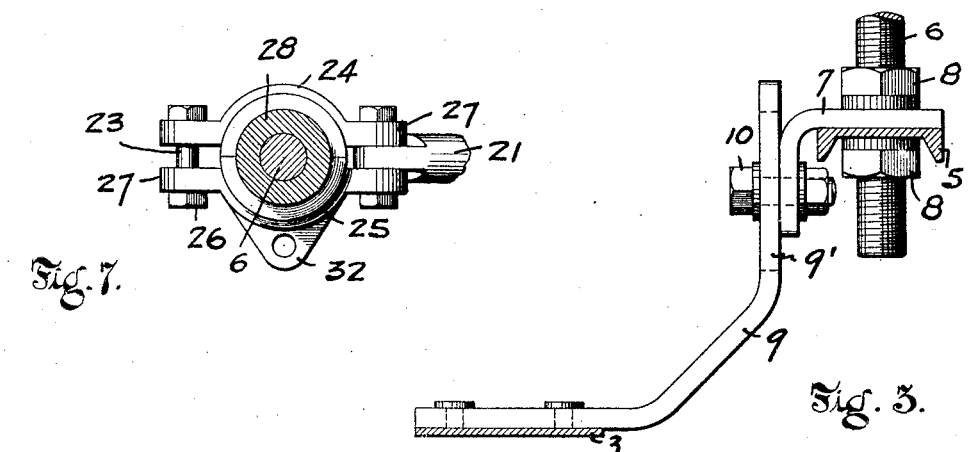
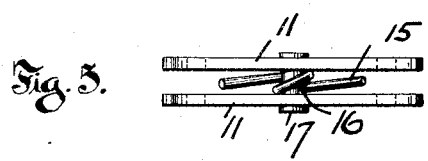
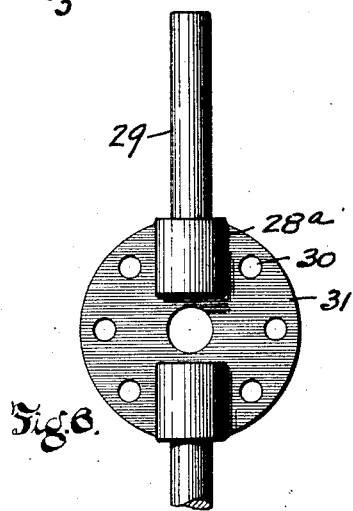
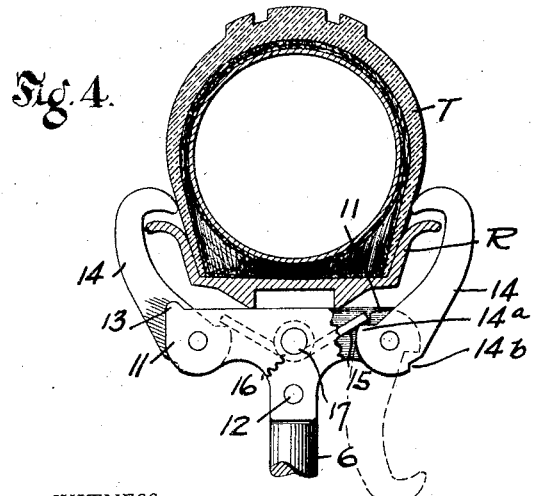
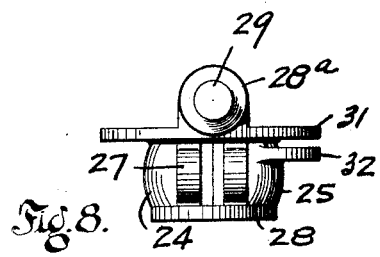

WONG YOU, OF SAN FRANCISCO, CALIFORNIA.

CARRIER AND RETRACTOR FOR WHEEL RIMS AND TIRES.

1,419,531. Specification of Letters Patent. Patented June 13, 1922.

Application filed January 19, 1921. Serial No. 438,353.

*To all whom it may concern:*

Be it known that I, WONG YOU, a citizen of the United States, and a resident of the city and county of San Francisco, State of California, have invented a certain new and useful Carrier and Retractor for Wheel Rims and Tires, of which the following is a specification.

This invention relates to a device adapted to be mounted upon a suitable support for holding a rim upon which there may be mounted a suitable tire such, for instance, as a pneumatic tire.

It is one of the objects of the present invention to provide a rim and tire carrier that is readily attachable to any suitable and convenient support and, more particularly, that is attachable to the body of an automobile or other vehicle having wheels upon which may be mounted and readily dismounted tire carrier rims.

Another object of the present invention is to provide a rim carrying device of simple, substantial and comparatively inexpensive cost of construction and installation. In this connection it is an object of the invention to provide a device that may be attached either directly to the body of a vehicle or other suitable support or that may be attached to such type of rim carrier or rack as may be originally provided with the vehicle; and further to provide a unitary or organized tire carrier and rim holder that may be applied to the original tire rack by simple adjustment of fastening means capable of being applied to the original rim and tire rack irrespective of the diameter of the same.

Another object of the present invention is to provide an organized, substantially unitary rim, rack, or carrier with elements readily adjustable so as to receive different sizes of wheel rims and securely hold the same applied; and furthermore to provide a device of this kind with fastening means which are provided with registrable parts adapted to be locked together, as by means of a padlock or suitable device to prevent unwarranted manipulation of the securing element.

In addition to the above objects it is a further purpose of the invention to provide means having, not only the function of securely holding an applied rim, but also having the function of contracting the ends of the rim at the split to facilitate the application and removal of the tire to the rim. In this connection it is a further object of the invention to provide means for directly assuming a hooking engagement with the rim and which means includes elements yieldingly mounted and controlled in either of a plurality of positions in which they may be set as desired according to the necessity.

The invention possesses other objects and features of advantage, some of which, with the foregoing, will be made manifest in the following description of the preferred form of the invention which is illustrated in the drawings accompanying and forming part of the specification. It is to be understood that it is not intended to limit the invention to the embodiment shown by the said drawings and description as variations may be adopted within the scope of the invention as set forth in the claims.

Referring to the drawings: Fig. 1 is an elevation of the device as applied to the rear of an automobile body; the device being attached to a rim carrier or rack-band as may be originally provided with the automobile, a rim and tire being applied to the device and broken away at one portion to show the original rack-band.

Fig. 2 is a central, vertical sectional view on line 2—2 of Fig. 1.

Fig. 3 is a detail view showing a form of fastening device for attaching the carrier to the original rack-band.

Fig. 4 is a detail view of the rim engaging jaws and hooks, the latter being shown in dotted lines in their retracted position.

Fig. 5 is a detail plan of the hook retaining spring.

Fig. 6 is a plan of the traveler nut showing the lock disc.

Fig. 7 is a plan of the cross-head and showing the lock lug.

Fig. 8 is an end elevation of the assembled traveling nut and cross-head thereon.

The present invention consists of a device constructed and organized to be applied and used as a unit for carrying and holding split or other forms of vehicle wheel rims and involves means whereby the carrier may be readily attached to any suitable or convenient support and especially for the application of the rack or carrier to automobile bodies; the attachment to be made directly to the body structure or to such rack or carrier as may be originally provided with the automobile body. Further it is a feature of the invention that the device may be applied to such original carrier as to present a neat and ornate appearance without in anywise altering or changing the construction of the usual appurtenances of the vehicle body or rim carrying band. The invention further embodies features enabling the utilization of the device for carrying rims varying greatly in sizes. The invention is so constructed that demountable rims may not only be securely fastened when placed upon the improved carrier but, also, the rim may be sprung inwardly to facilitate the application to, and removal from, the carrier of a given form of rim to which the device may have been adjustably set.

In the drawings the device is shown as applied to the rear body portion 2 of an automobile having, in the present case, a rim receiving rack or band 3 such as may be originally provided with the stock automobile. It is to be understood that while the device is shown as applied to this original band it is equally applicable to any other suitable supporting means or device in the absence or removal of the band 3.

The preferred form of the device includes a main body or frame 5 in the form of a ring that may be made of channel shaped metal and through this ring or frame is extended diametrically a jack screw 6 also passing through an L-shaped lug 7 on the inner face of the frame 5. The jack screw 6 is adjustable axially in the frame 5 and secured as by means of lock nuts 8—8. To effect attachment of the frame to the band 3 suitable bracket irons 9 have their outer ends riveted or bolted to the original band 3 and their inner ends are slotted as at 9' to receive bolts 10 passing through the contiguous end of a lug 7.

It will be seen that by means of the slotted bracket 9 the circular frame 5 may be set concentric with the supporting band 3 to which it may be applied irrespective of the size of the band and it will also be seen that the jack rod 6 may be shifted bodily axially with respect to the plane of the frame as may be desired according to the size of the rim to be carried.

The rim fastening means includes a set of jaws or pressure members adapted to be moved outwardly or retracted according to the size of the rim to be mounted and then locked securely in the desired position to hold the applied rim. Preferably one end of the jack screw 6 is provided with a rim engaging jaw or device which may consist of a pair of laterally spaced, T-shaped heads or plates 11 seated against the recessed outer end of the screw 6 and riveted or otherwise secured thereon as at 12 to assume a position transverse to the rim R. The upper and outer corners of the jaw forming elements are provided with projections or lugs 13 to prevent the forcing off of the applied rim R after the jaws have been set. Between the spaced jaw plates 11 is pivoted a pair of opposed hooks 14 to be turned into outer position shown in Fig. 4 when it is desired to utilize the device to contract the ends of the split rim R. When the hooks 14 are turned to the outermost hooking position they are maintained through means of a spring 15 having opposite tangential arms extended from a central coil 16 about a retaining pin 17 passing through the plate. The outer ends of a spring are adapted to engage shoulders $14^a$ when the hooks 14 are turned to the outermost position as shown in full lines Fig. 4 and thus hold the hooks yieldingly in that position. When the hooks are withdrawn and thrown downwardly to the dotted line position the spring arms then engage on the shoulders $14^b$ at the hubs of the hooks so that the hooks are held retracted.

Preferably a set of three jaw devices is utilized, one jaw being disposed so that the rim when applied will have its portion that is opposite to the split S in engagement with the upper jaw while each of the remaining two jaws are disposed adjacent to the ends of the split rim, one being somewhat nearer the line of the split than the other as shown in Fig. 1, so that the hooks 14 are thrown to the hooking position and the jaws are relatively contracted then there will be a differential movement of the split ends of the rim so that one will move in more quickly than the other to permit a relative overlapping of the inwardly moving ends and thus facilitate the contraction of the rim and the removal of an applied tire or the application of a tire.

The lower rim jaw devices are substantially the same in construction as that carried by the upper end of the jack screw 6 so that the above description applies to the lower jaws and these are mounted upon respective rods 20 and 21 passing through apertures 22 in the frame 5 on opposite sides of the intermediate lower end of the jack screw 6.

The inner ends of the rods 20 and 21 are pivotally connected at 23 in a cross head comprising complementary collar sections 24 and 25, Fig. 7, that are secured by parallel bolts 26 passing through lateral ears 27 of the collar section, the shanks of the bolts forming the pivots 23 of the rods 20 and 21. This cross head is loosely mounted upon the cylindrical body of a nut 28 threaded on the jack screws 6 so that as the nut is turned about the jack screw it will relatively shift the connected arms or rods 20 and 21 with respect to the jack screw and the uppermost jaw device supporting that portion of the split rim opposite the split S or approximately opposite the line. To facilitate the rotation of the nut 28 about the jack screw the upper portion of the nut above the cross head 28 is provided with opposite bearings 28ª from which extend handle rods 29 that are preferably coaxial.

By virtue of the adjustable fastening devices 7 and 9 the circular frame 5 may be readily centered with respect to the original rim receiving band 3 irrespective of the diameter of the band to present a neat appearance and the jack screw 6 can be shifted across the band to assume the proper radial position with respect to the center of the frame 5 and the diameter of the rim to be applied so that the upper jaw on the end of the jack screw may be considered as stationary with respect to the frame and device as a whole while the lower jaws on the ends of the rods 20 and 21 may be shifted inwardly or outwardly by rotation of the traveling nut 28 on the jack screw carrying with it the cross head formed by the sections 24 and 25.

The operation of the device is substantially as follows: The organized device having been applied, as a whole, to suitable supporting portions on the body of an automobile, or if desired, any other support, and the circular frame 5 having been adjusted to the desired concentric position with respect to the original supporting ring or band 3 and the upper jaw device at the end of the jack screw having been arranged according to the diameter of the rim to be applied, the rods 20 and 21 are adjusted to such position as to bring the lower retaining jaw-devices sufficiently inwardly or toward the frame 5 to enable the rim R to be deposited upon the fixed upper jaw at the end of screw 6, preferably with the split S at about the position shown in Fig. 1 below the bottom of the frame. The rim R is then swung inwardly below the position of the lower securing jaws and by rotating the traveling nut 28 in one direction it will descend along the jack screw carrying with it the cross head and the rods 20 and 21 so that the operative outer and transverse faces of the jaw plates 11 of the bottom jaws are forced against the inner annular surface of the applied rim, during which operation the several hooks 14 are preferably in their retracted or innermost position to clear the rim.

To prevent the unwarranted removal of the rim after it has been applied to the carrier a padlock or other suitable device may be applied so as to lock the respective elements of the organization against movement without the application of a proper controlling key. The locking of the parts may be conveniently secured by passing the shackle of a lock through one or another of apertures 30 provided in a disc portion 31 of the nut 28 according as to which of these apertures may be, at that time, registering with a perforated lug 32 provided on one of the members of the cross heads 24—25. If it be desired to place on or remove a tire from an applied rim then the several hooks 14 are thrown to overhooking position as shown in Fig. 4 and by the rotation of the nut about the screw so as to retract the rods 20 and 21, and also the lower sets of hooks, as to the frame 5 then the ends of the rim will be flexed inwardly.

The jaws of the lower ends of the rods 20 and 21 are set at different distances from the line of the split S and, in this case, as the rod 20 moves inwardly its connected end of the rim will move inwardly faster than the end that is attached to the hooks on the end of the rod 21 so that the split ends will clear each other while bending inwardly. To facilitate this clearance the apertures in the frame 5 through which the rods 20 and 21 slide are of such size that as the rods move inwardly they will rock on the edges of the openings and this rocking or tilting of the lever-like rods will increase the inward bending or flexing of the rim ends. Since the hooks at the end of the rod 20 are disposed more remotely from the split than the hooks at the end of the rod 21 the differential movement, as above described, will cause one end to move inwardly faster than the other, therefore the split ends will clear without interference. After the rim has been sufficiently flexed inwardly as above described the tire may then be applied or removed. Normally, while the carrier is being utilized for its purpose of carrying and locking an applied rim then the retracting hooks 14 will ordinarily be thrown inwardly to the dotted line position and secured against rattling by the spring device 15.

What is claimed is:

1. A rim carrier having a frame and adjustable brackets for attaching it to a circular support, a set of arms radially slidable in the frame and having rim-engaging jaws, a slide connecting the arms and a screw for shifting the slide and the arms to secure or release an applied rim, one end of the screw supporting the rim.

2. A rim carrier having a frame with means for attaching it to a support, a jackscrew adjustable radially across the frame and having at its outer end a jaw to engage the rim, and slide mounted upon said screw, and arms attached to the slide and sliding in said frame to secure and release an applied rim on the screw-jaw, said slide having relatively rotatable parts to be locked in arm securing position.

3. A rim carrier having a frame with means for securing it to a support, a jack-screw radially adjustable across and projecting through the frame and having a rim jaw, a nut mounted on the screw within the frame, a cross-head on the nut and rim engaging means connected to the cross-head and sliding in the frame, the cross-head and the nut having registrable parts to receive a lock shackle.

In testimony whereof, I have hereunto set my hand.

WONG YOU.